United States Patent

Muller et al.

(10) Patent No.: US 10,318,603 B2
(45) Date of Patent: Jun. 11, 2019

(54) RECIPROCAL TAGS IN SOCIAL TAGGING

(75) Inventors: Michael Muller, Medford, MA (US);
Meggan H. Todd, Arlington, MA (US)

(73) Assignee: International Business Machines Corporation, Armonk, NY (US)

( * ) Notice: Subject to any disclaimer, the term of this patent is extended or adjusted under 35 U.S.C. 154(b) by 1291 days.

(21) Appl. No.: 12/327,870

(22) Filed: Dec. 4, 2008

(65) Prior Publication Data

US 2010/0146010 A1   Jun. 10, 2010

(51) Int. Cl.
*G06F 16/954*   (2019.01)
*G06F 16/958*   (2019.01)

(52) U.S. Cl.
CPC .......... *G06F 16/954* (2019.01); *G06F 16/986* (2019.01)

(58) Field of Classification Search
USPC .................................. 707/660–668; 709/206
See application file for complete search history.

(56) References Cited

U.S. PATENT DOCUMENTS

| | | | | |
|---|---|---|---|---|
| 7,613,769 B1 * | 11/2009 | Hess | ...................... | G06Q 30/02 707/999.005 |
| 7,885,986 B2 * | 2/2011 | Anderson | ......... | G06F 17/30884 707/805 |
| 8,582,801 B2 * | 11/2013 | Goto | ...................... | G06F 3/0482 382/100 |
| 8,601,162 B1 * | 12/2013 | O'Shaughnessy | ...... | H04L 67/06 709/200 |
| 8,832,109 B2 * | 9/2014 | Ghanea-Hercock | .... | H04L 67/16 707/737 |
| 2005/0159998 A1 * | 7/2005 | Buyukkokten | ........ | G06Q 50/01 705/319 |
| 2006/0004713 A1 * | 1/2006 | Korte | ................ | G06F 17/30867 |
| 2008/0086496 A1 * | 4/2008 | Kumar | ................ | G06F 17/3089 |
| 2008/0104032 A1 * | 5/2008 | Sarkar | ................ | G06F 17/3089 |
| 2008/0282198 A1 * | 11/2008 | Brooks | ................... | G06Q 10/10 715/854 |
| 2008/0301237 A1 * | 12/2008 | Parsons | .................. | G06Q 10/10 709/206 |
| 2009/0037529 A1 * | 2/2009 | Armon-Kest | ..... | G06F 17/30206 709/204 |
| 2009/0094020 A1 * | 4/2009 | Marvit | .............. | G06F 17/30616 704/9 |

(Continued)

*Primary Examiner* — Mark D Featherstone
*Assistant Examiner* — Navneet Gmahl
(74) *Attorney, Agent, or Firm* — Steven M. Greenberg, Esq.; Shutts & Bowen LLP

(57) ABSTRACT

Embodiments of the present invention provide a method, system and computer program product for reciprocal tagging of resources in a computer communications network. A method for reciprocal tagging of resources can include specifying a resource in a computing system for tagging and identifying a reciprocal resource to the specified resource and generating a tag for a specified resource, the tag referencing the reciprocal resource and specifying a relationship between the specified resource and the reciprocal resource. The method further can include additionally generating a reciprocal tag for the reciprocal resource, the reciprocal tag referencing the specified resource in the reciprocal tag and indicating a reciprocal relationship between the specified resource and the reciprocal resource. Finally, the method can include storing both tags in a data store of reciprocal tags for subsequent access.

16 Claims, 1 Drawing Sheet

(56) References Cited

U.S. PATENT DOCUMENTS

| | | | |
|---|---|---|---|
| 2009/0144240 A1* | 6/2009 | Singh | G06F 17/30864 |
| 2009/0157645 A1* | 6/2009 | Green | G06F 17/30038 |
| 2009/0193520 A1* | 7/2009 | Buss | G06Q 10/107 |
| | | | 726/21 |
| 2010/0030722 A1* | 2/2010 | Goodson | G06Q 30/02 |
| | | | 706/54 |
| 2010/0030752 A1* | 2/2010 | Goldentouch | G06F 17/30911 |
| | | | 707/797 |
| 2014/0109007 A1* | 4/2014 | Hartman | G06F 17/30268 |
| | | | 715/810 |

\* cited by examiner

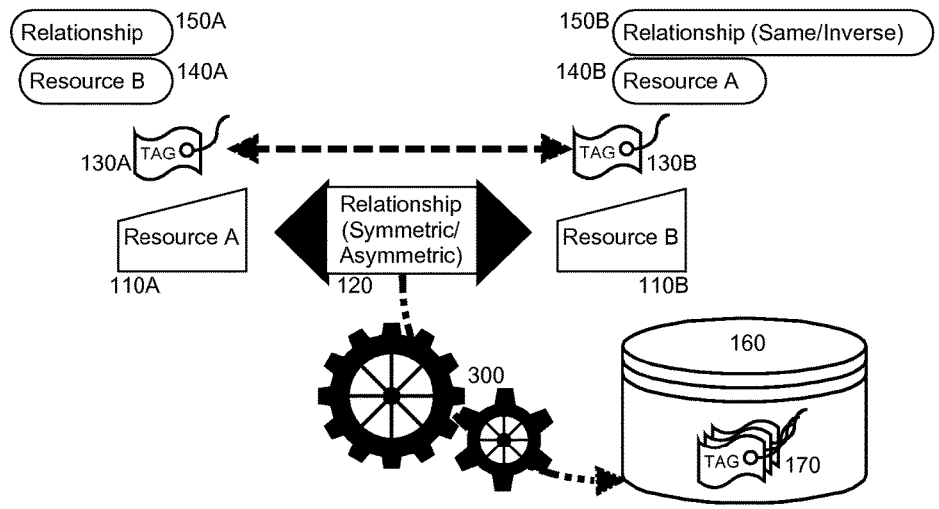
FIG. 1
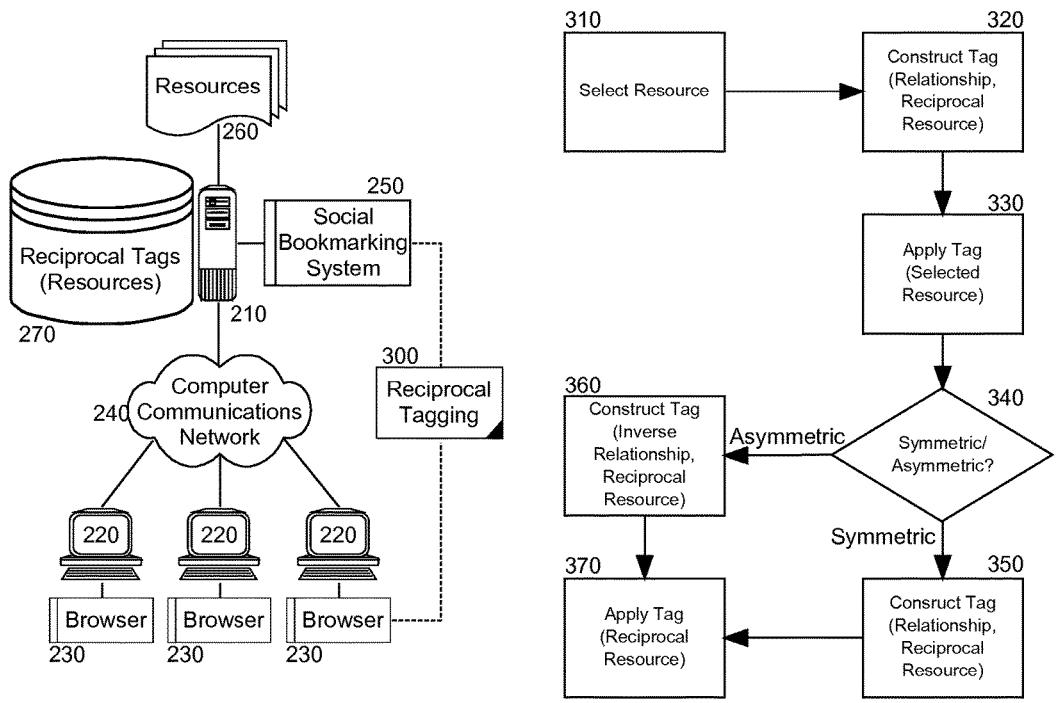
FIG. 2
FIG. 3

RECIPROCAL TAGS IN SOCIAL TAGGING

BACKGROUND OF THE INVENTION

Field of the Invention

The present invention relates to the field of bookmarking content and more particularly to social bookmarking.

Description of the Related Art

Content browsing refers to the retrieval and presentation of electronic content in a browser client. Content generally can include electronic documents, messages, audio, audio-visual and video materials and imagery. Most commonly, content can be stored in a server environment and published for access by content consumers over a computer communications network such as the global Internet. Content consumers, in turn, can retrieve content over the network by reference to a network address for the content. Once retrieved, the content can be presented in a browser client including not only conventional visual browsers such as the venerable Web browser, but also in alternative browsers such as those deployed in pervasive devices and those supporting different modes of presentation such as the audible presentation of material.

Given the vast amount of content published for accessibility over the Internet, modern content browsers provide a mechanism for ably retrieving previously accessed content. Known as a "bookmark" or "favorite" (collectively referred to as a bookmark), this structure allows end users to record content of interest. Subsequently, end users can access a list of bookmarks in order to recall the content of interest without being compelled to recall from memory the precise uniform resource indicator (URI) for the content of interest.

While bookmarking reflects the personal experience of individual users, social bookmarking provides a foundation for users within a social group to store, organize, share and search the bookmarks collectively established by the users within the social group. In the operation of a social bookmarking system, users save links to memorable content. Unlike traditional unshared bookmarks however, in a social bookmarking system the links subsequently can be published for public inspection and use so as to provide a communal repository of bookmarks. Consequently, groups of the users can access the links encapsulated within respective social bookmarks, though the groups of users in fact may never have viewed the associated content—a prerequisite for a traditional unshared bookmark.

Social bookmarking services often encourage users in a social network to annotate bookmarks with meta-information referred to as "tags" rather than merely storing bookmarks in a traditional file hierarchy. As such, users processing tags for a social bookmark can view the social bookmark for content along with the tag pertaining to the bookmark, for instance a number of users having bookmarked the content. Further, some social bookmarking services infer clusters of bookmarks from the relationship of corresponding tags. Finally, many social bookmarking services provide subscription based feeds for lists of bookmarks, including lists organized by tags. Consequently, subscribers can become aware of new bookmarks as the bookmarks are saved, shared, and tagged by other users.

Of note, social tags have been used to describe much more than Web site content. In this regard, social tags also have been applied to uniform resource locators (URLs), documents, blogs, podcasts and even individual people and groups of people. As such, tags have evolved into a generic descriptor. Yet, tags have been used not only as a descriptor of an associated resource, but also as a descriptor of an action to be performed in connection with a tagged resource, or as a characterization of a relationship enjoyed by a person applying a tag to a resource and the resource itself. It will be apparent to the skilled artisan then, that given the evolving complexity of tag usage, managing the complex relationships between different tagged resources has grown increasingly difficult.

BRIEF SUMMARY OF THE INVENTION

Embodiments of the present invention address deficiencies of the art in respect to resource tag management and provide a novel and non-obvious method, system and computer program product for reciprocal tagging of resources in a computer communications network. In an embodiment of the invention, a method for reciprocal tagging of resources in a computer communications network can include specifying a resource in a computing system for tagging and identifying a reciprocal resource to the specified resource and generating a tag for a specified resource, the tag referencing the reciprocal resource and specifying a relationship between the specified resource and the reciprocal resource. The method further can include additionally generating a reciprocal tag for the reciprocal resource, the reciprocal tag referencing the specified resource in the reciprocal tag and indicating a reciprocal relationship between the specified resource and the reciprocal resource. Finally, the method can include storing both tags in a data store of reciprocal tags for subsequent access.

In one aspect of the embodiment, specifying a resource in a computing system for tagging and identifying a reciprocal resource to the specified resource can include selecting a resource from a list of resources in the computing system. In another aspect of the embodiment, specifying a resource in a computing system for tagging and identifying a reciprocal resource to the specified resource can include receiving a selection by a user of a resource referencing an identity of the user, and specifying the selected resource for tagging. In yet another aspect of the embodiment, storing both tags in a data store of reciprocal tags for subsequent access further can include storing each of the tags along with references to both the specified resource and the reciprocal resource. Finally, in even yet another aspect of the embodiment, the generated tag can be deleted for the specified resource from the data store, an, responsive to deleting the generated tag, the reciprocal tag to the generated tag can be located and deleted from the data store.

Optionally, indicating a reciprocal relationship between the specified resource and the reciprocal resource in the reciprocal tag can include determining whether the reciprocal relationship is symmetric or asymmetric, and specifying a reciprocal relationship for the reciprocal tag as the relationship specified in the generated tag, but otherwise specifying a reciprocal relationship for the reciprocal tag as an inverse of the relationship specified in the generated tag. In this regard, storing both tags in a data store of reciprocal tags for subsequent access further can include, in response to determining the reciprocal relationship to be asymmetric, storing an indication of directionality of the reciprocal relationship of each tag to the specified resource and the reciprocal resource.

In another embodiment of the invention, a data processing system can be configured for reciprocal tagging of resources in a computer communications network. The system can include a data store of reciprocal tags coupled to a social bookmarking system executing in a host server and different resources that are accessible through the social bookmarking system. The system also can include a reciprocal tagging module coupled to the social bookmarking system. The module can include program code enabled to specify a resource among the resources for tagging and to identify a reciprocal resource among the resources to the specified resource, to generate a tag for a specified resource, the tag referencing the reciprocal resource and specifying a relationship between the specified resource and the reciprocal resource, to additionally generate a reciprocal tag for the reciprocal resource, the reciprocal tag referencing the specified resource in the reciprocal tag and indicating a reciprocal relationship between the specified resource and the reciprocal resource, and to store both tags in the data store. In this regard, the reciprocal relationship can be either symmetric or asymmetric.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein:

FIG. 1 is a pictorial illustration of a process for reciprocal tagging of resources in a computer communications network;

FIG. 2 is a schematic illustration of a data processing system configured for reciprocal tagging of resources in a computer communications network; and, FIG. 3 is a flow chart illustrating a process for reciprocal tagging of resources in a computer communications network.

DETAILED DESCRIPTION OF THE INVENTION

Embodiments of the present invention provide a method, system and computer program product for reciprocal tagging of resources in a computer communications network. In accordance with an embodiment of the present invention, a social tag can be created for and applied to a resource. The tag can specify both a relationship and a reciprocal resource to the tagged resource. The relationship can be symmetric or asymmetric. For a symmetric relationship, a reciprocal tag can be created for the reciprocal resource and applied to the reciprocal resource specifying the relationship and referencing the tagged resource. For an asymmetric relationship, a reciprocal tag can be created for the reciprocal resource and applied to the reciprocal resource specifying an inverse form of the relationship and referencing the tagged resource. Thereafter, the tags can be stored in a directory and managed to account for the reciprocal nature of the tags.

In illustration, FIG. 1 pictorially shows a process for reciprocal tagging of resources in a computer communications network. As shown in FIG. 1, resources 110A, 110B having a recognizable relationship 120 in a computing system can be tagged with tags 130A, 130B. Specifically, reciprocal tagging module 300 can generate a tag 130A for a selected resource 110A to include both a reference to a reciprocal resource 110B and also a specification of a relationship 140A between the selected resource 110A and the reciprocal resource 110B. Consequently, the reciprocal tagging module 300 can generate a tag 130B for the reciprocal resource 110B to include both a reference to the selected resource 110A and also a specification of a relationship 140B between the selected resource 110A and the reciprocal resource 110B.

In this regard, the relationship 140B can be symmetrical and thus match the relationship 140A of the tag 130A, or the relationship 140B can be asymmetrical and can be an inverse of the relationship 140A of the tag 130A. By way of example, a symmetrical relationship can include "colleague" or "teammate" or "sibling". In contrast, an asymmetrical relationship can include by way of example "parent-child", "employer-employee" "prior version-subsequent version" and the like. It will be appreciated, however, that nearly unlimited possibilities exist in terms of relationships between resources in a computing system.

Once the tags 130A, 130B have been generated by reciprocal tagging module 300, the tags 130A, 130B can be stored amongst other tags 170 in a data store 160, for instance a database or directory. Once stored within the data store 160, the tags 170 can be edited or removed. When editing or removing a given one of the tags 170, a corresponding one of the tags 170 that is reciprocal in nature also can be edited or removed as the case may be in recognition of the relationship 120 defined there between. For example, removing tag 130A from the data store 160 will result necessarily in the removal of tag 130B from the data store 160.

The process described in connection with FIG. 1 can be implemented in a data processing system configured for reciprocal tagging. In further illustration, FIG. 2 schematically shows a data processing system configured for reciprocal tagging of resources in a computer communications network. The system can include a host server 210 supporting the operation of a social bookmarking system 250. The host server 210 can be configured for communicative coupling to multiple different clients 220 over computer communications network 240 such that browsers 230 executing in respective ones of the clients 220 can access the functionality of the social bookmarking system 250 to generated and apply tags to resources 260 accessible by the clients 220.

Notably, reciprocal tagging module 300 can be coupled to the social bookmarking system 250 and the browsers 230. Specifically, the reciprocal tagging module 300 can be disposed in the host server 210, the clients 220 or in a different server (not shown) while remaining accessible to the clients 220 through respective browsers 230. The reciprocal tagging module 300 can include program code enabled to generate and store tags in a data store of reciprocal tags 270 each for a corresponding resource 260. Each of the tags in the data store of reciprocal tags 270 can reference a reciprocal one of the resources 260 and can specify a relationship with the reciprocal one of the resources 260. The relationship can include a symmetrical relationship or an asymmetrical relationship.

The program code of the reciprocal tagging module 300 also can be enabled as such to manage each of the tags in the data store of reciprocal tags 270 in accordance with the relationships specified thereby. In this regard, when generating and adding a tag to the data store of reciprocal tags 270 for a selected one of the resources 260, a reciprocal tag can be generated and stored in the data store of reciprocal tags 270 for a reciprocal one of the resources 260 in respect to the selected one of the resources 260. Likewise, when removing a tag from the data store of reciprocal tags 270 for a selected one of the resources 260 and referencing a reciprocal one of the resources 260, a corresponding tag for the reciprocal one of the resources 260 and referencing the selected one of the resources 260 also can be removed from the data store of reciprocal tags 270.

In yet further illustration of the operation of the reciprocal tagging module 300, FIG. 3 is a flow chart illustrating a process for reciprocal tagging of resources in a computer communications network. Beginning in block 310, a resource can be specified, for instance a person, document, network address, Web page, bookmark and the like. For example, the resource can be specified by selecting the resource from a list of resources. Optionally, the specified resource when specified by a user can reference an identity of the user. In block 320, a tag can be constructed for the selected resource. Specifically, the tag can reference a reciprocal resource to the selected resource and the tag can specify a relationship there between. In this regard, the relationship can be symmetrical in nature, or asymmetrical in nature. Thereafter, the tag can be applied to the resource by way of association in a data store of reciprocal tags like a directory, for example.

In decision block 340, it can be determined whether or not the relationship specified by the tag is symmetrical or asymmetrical in nature (for instance, by consulting a table defining symmetrical and asymmetrical relationships). If the relationship is determined to be symmetrical in nature, in block 350 a tag can be constructed for the reciprocal resource that specifies the same relationship as the tag for the selected resource. Otherwise, if the relationship is determined to be asymmetrical in nature, in block 360 a tag can be constructed for the reciprocal resource that specifies the inverse of the relationship for the tag for the selected resource. In either case, in block 370 the tag can be applied to the reciprocal resource by way of association in the data store of reciprocal tags. For instance, each of the tags can be stored in the data store along with references to both the specified resource and the reciprocal resource. Further, in the case of an asymmetric reciprocal relationship, an indication of directionality of the reciprocal relationship of each tag to the specified resource and the reciprocal resource can be stored in the data store.

The process described in connection with FIG. 3 can be applied to the use case of document management in which different documents are tagged as a version of another document in an asymmetrical parent-child relationship. The process described in connection with FIG. 3 also can be applied to the use case of Web page navigation with each page being tagged as a sibling of another page in a symmetrical sibling-sibling relationship. The foregoing use cases, however, are non-limiting in nature and merely illustrate the potentially applicability of the broad concept described in connection with the process of FIG. 3.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A method for reciprocal tagging of resources in a computer communications network, the method comprising:

specifying a resource in a computing system for tagging and identifying a reciprocal resource to the specified resource, the specified resource comprising a document in a document processing system;

generating a tag in a social bookmarking system for a specified resource, the tag comprising a bookmark with meta-information, the tag in the social bookmarking system referencing the reciprocal resource and specifying a relationship between the specified resource and the reciprocal resource as one of a symmetrical relationship or asymmetrical relationship, the symmetrical relationship defining a relationship between two individuals applying the tag who are hierarchically equivalent in role, the asymmetrical relationship defining a relationship between two individuals applying the tag who are hierarchically different in roles one being senior to the other;

additionally generating a reciprocal tag in the social bookmarking system for the reciprocal resource, the reciprocal tag referencing the specified resource in the reciprocal tag and indicating a reciprocal relationship between the specified resource and the reciprocal resource;

storing both tags in a data store of reciprocal tags for subsequent access in the social bookmarking system; and, subsequently responding to changes made in the social bookmarking system to the generated tag by also making the same changes to the generated reciprocal tag.

2. The method of claim 1, wherein specifying a resource in a computing system for tagging and identifying a reciprocal resource to the specified resource comprises selecting a resource from a list of resources in the computing system.

3. The method of claim 1, wherein specifying a resource in a computing system for tagging and identifying a reciprocal resource to the specified resource comprises:

receiving a selection by a user of a resource referencing an identity of the user; and, specifying the selected resource for tagging.

4. The method of claim 1, wherein indicating a reciprocal relationship between the specified resource and the reciprocal resource in the reciprocal tag comprises:

determining whether the reciprocal relationship is symmetric or asymmetric; and, specifying a reciprocal relationship for the reciprocal tag as the relationship specified in the generated tag, but otherwise specifying a reciprocal relationship for the reciprocal tag as an inverse of the relationship specified in the generated tag.

5. The method of claim 1, further comprising:

deleting the generated tag for the specified resource from the data store; and, responsive to deleting the generated tag, locating the reciprocal tag to the generated tag and deleting the reciprocal tag from the data store.

6. The method of claim 1, wherein storing both tags in a data store of reciprocal tags for subsequent access further comprises storing each of the tags along with references to both the specified resource and the reciprocal resource.

7. The method of claim 4, wherein storing both tags in a data store of reciprocal tags for subsequent access further comprises, responsive to determining the reciprocal relationship to be asymmetric, storing an indication of directionality of the reciprocal relationship of each tag to the specified resource and the reciprocal resource.

8. A data processing system configured for reciprocal tagging of resources in a computer communications network, the system comprising:

a data store of reciprocal tags each comprising a bookmark with meta-information, the data store being coupled to a social bookmarking system executing in memory of a host server;

a plurality of resources accessible through the social bookmarking system, the resources each comprising a document in a document processing system; and, a reciprocal tagging module coupled to the social bookmarking system, the module comprising program code enabled to specify a resource among the resources for tagging and to identify a reciprocal resource among the resources to the specified resource, to generate a tag in the social bookmarking system for a specified resource, the tag referencing the reciprocal resource and specifying a relationship between the specified resource and the reciprocal resource as one of a symmetrical relationship or asymmetrical relationship, the symmetrical relationship defining a relationship between two individuals applying the tag who are hierarchically equivalent in role, the asymmetrical relationship defining a relationship between two individuals applying the tag who are hierarchically different in roles one being senior to the other, to additionally generate a reciprocal tag in the social bookmarking system for the reciprocal resource, the reciprocal tag referencing the specified resource in the reciprocal tag and indicating a reciprocal relationship between the specified resource and the reciprocal resource, to store both tags in the data store, and to subsequently respond to changes made in the social bookmarking system to the generated tag by also making the same changes to the generated reciprocal tag.

9. The system of claim 8, wherein the reciprocal relationship is either symmetric or asymmetric.

10. A computer program product comprising a non-transitory computer usable storage medium storing computer usable program code for tagging of resources in a computer communications network, the computer program product comprising:

computer usable program code for specifying a resource in a computing system for tagging and identifying a reciprocal resource to the specified resource, the specified resource comprising a document in a document processing system;

computer usable program code for generating a tag in a social bookmarking system for a specified resource, the tag comprising a bookmark with meta-information, the tag referencing the reciprocal resource and specifying a relationship between the specified resource and the reciprocal resource;

computer usable program code for additionally generating a reciprocal tag for the reciprocal resource in the social bookmarking system, the reciprocal tag referencing the specified resource in the reciprocal tag and indicating a reciprocal relationship between the specified resource and the reciprocal resource as one of a symmetrical relationship or asymmetrical relationship, the symmetrical relationship defining a relationship between two individuals applying the tag who are hierarchically equivalent in role, the asymmetrical relationship defining a relationship between two individuals applying the tag who are hierarchically different in roles one being senior to the other;

computer usable program code for storing both tags in a data store of reciprocal tags for subsequent access in the social bookmarking system; and, computer usable program code subsequently responding to changes made in the social bookmarking system to the generated tag by also making the same changes to the generated reciprocal tag.

11. The computer program product of claim 10, wherein the computer usable program code for specifying a resource in a computing system for tagging and identifying a reciprocal resource to the specified resource comprises computer usable program code for selecting a resource from a list of resources in the computing system.

12. The computer program product of claim 10, wherein the computer usable program code for specifying a resource in a computing system for tagging and identifying a reciprocal resource to the specified resource comprises:

computer usable program code for receiving a selection by a user of a resource referencing an identity of the user; and, computer usable program code for specifying the selected resource for tagging.

13. The computer program product of claim 10, wherein the computer usable program code for indicating a reciprocal relationship between the specified resource and the reciprocal resource in the reciprocal tag comprises:

computer usable program code for determining whether the reciprocal relationship is symmetric or asymmetric; and, computer usable program code for specifying a reciprocal relationship for the reciprocal tag as the relationship specified in the generated tag, but otherwise specifying a reciprocal relationship for the reciprocal tag as an inverse of the relationship specified in the generated tag.

14. The computer program product of claim 10, further comprising:

computer usable program code for deleting the generated tag for the specified resource from the data store; and, computer usable program code for responsive to deleting the generated tag, locating the reciprocal tag to the generated tag and deleting the reciprocal tag from the data store.

15. The computer program product of claim 10, wherein the computer usable program code for storing both tags in a data store of reciprocal tags for subsequent access further comprises computer usable program code for storing each of the tags along with references to both the specified resource and the reciprocal resource.

16. The computer program product of claim 13, wherein the computer usable program code for storing both tags in a data store of reciprocal tags for subsequent access further comprises, computer usable program code for storing an indication of directionality of the reciprocal relationship of each tag to the specified resource and the reciprocal resource in response to determining the reciprocal relationship to be asymmetric.

* * * * *